INVENTOR.
M. R. CINES

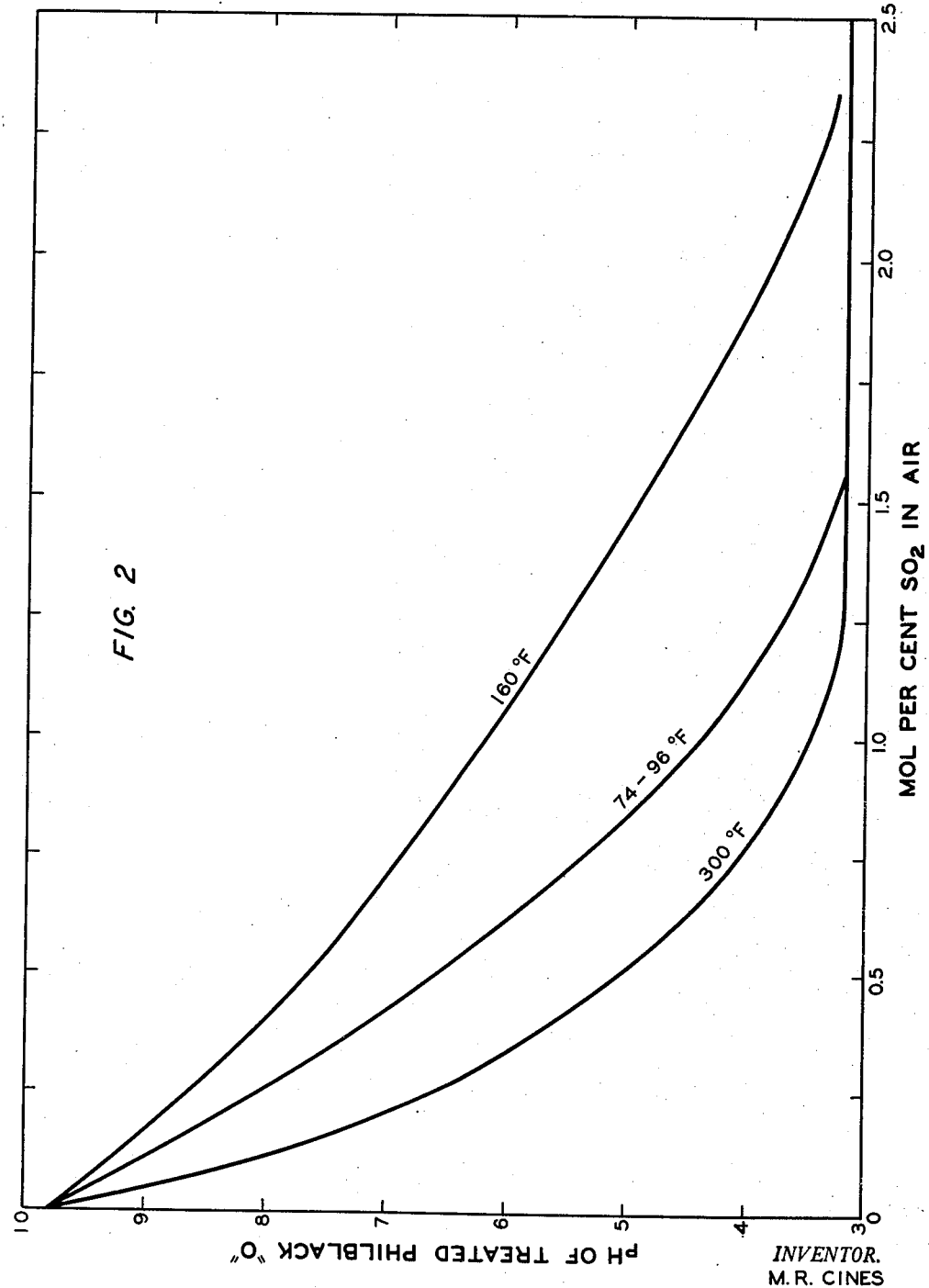

Patented June 9, 1953

2,641,535

UNITED STATES PATENT OFFICE 2,641,535

TREATMENT OF FURNACE BLACKS

Martin R. Cines, Bartlesville, Okla., assignor to Phillips Petroleum Company, a corporation of Delaware Application April 14, 1949, Serial No. 87,473

4 Claims. (Cl. 23—209.9)

This invention relates to a method of treating furnace blacks. In a more specific aspect, it relates to a method of improving the rubber compounding properties of furnace black. In a still more specific aspect, it relates to a method of increasing the scorch time, lowering the pH, and increasing the pellet hardness of furnace blacks. In another specific aspect, it relates to a method of producing a more hydrophilic furnace black.

The early carbon blacks used in the compounding of rubber were produced by the channel process whereby natural gas was burned in a deficiency of oxygen and the flame was caused to impinge upon a relatively cool metal surface, whereon carbon was deposited and from which it was afterwards removed and recovered. Channel blacks are characterized by long scorch times, low pH's, and the ease of formation of hard pellets. The major disadvantages of the channel black process are its inefficiency and low yield of black.

A more efficient process, generally known as the furnace black process, has recently come into extensive use. This process permits the use of gas and/or liquid hydrocarbon feeds and gives high yields. This new type of carbon black is generally designated as furnace black and while it is superior to channel blacks for some uses, for others it may be somewhat inferior. Some of the difficulties encountered with furnace blacks are the tendency to produce soft pellets and the relatively short scorch times observed in some rubber mixes. It is important that the scorch time be sufficiently long to permit all mechanical processing of the rubber mix before vulcanization begins.

Furnace blacks are defined as carbon black produced by thermal decomposition and reforming and/ or partial combustion of hydrocarbons in a reducing atmosphere. In contrast, channel blacks are produced in an atmosphere containing oxygen. Furnace blacks are generally characterized by an alkaline pH while channel blacks generally have an acid pH, usually less than six. While a high pH is not objectionable in itself, in a furnace black it is generally indicative of a short scorch time and difficulty in producing hard pellets.

In my application Serial No. 67,674, filed December 28, 1948, I have disclosed a process for treating furnace blacks with air at a temperature between 400 and 1200° F. to increase the scorch time, increase the hardness of pellets, and lower the pH of the treated black.

I have now discovered a process by which it is possible to treat furnace blacks at moderate temperatures with a current of air or other oxygen-containing gas containing, as catalyst, a minor quantity of sulfur dioxide so that the scorch time is increased, the pellets are made harder, the black is made more hydrophilic, and the pH is lowered. By operating at moderate temperatures, it is possible to obtain excellent treating results without losing any appreciable amount of the furnace black through burning. Treating at these temperatures obviates the use of extensive heating and temperature control apparatus.

The principal object of my invention is to provide a process for treating furnace blacks.

Another object is to provide a process for lowering the pH of furnace blacks.

Another object is to provide a process for increasing the scorch time of furnace blacks.

Another object is to provide a process for increasing the hardness of furnace black pellets.

Still another object is to provide a process for producing a more hydrophilic furnace black.

Other objects and advantages of my invention will be apparent to those skilled in the art upon reading the following description, drawings and claims.

Figure 2 is a series of curves showing the pH reduction brought about by treating furnace black samples with air containing catalytic amounts of sulfur dioxide at the temperatures indicated on the various curves.

Figure 1:
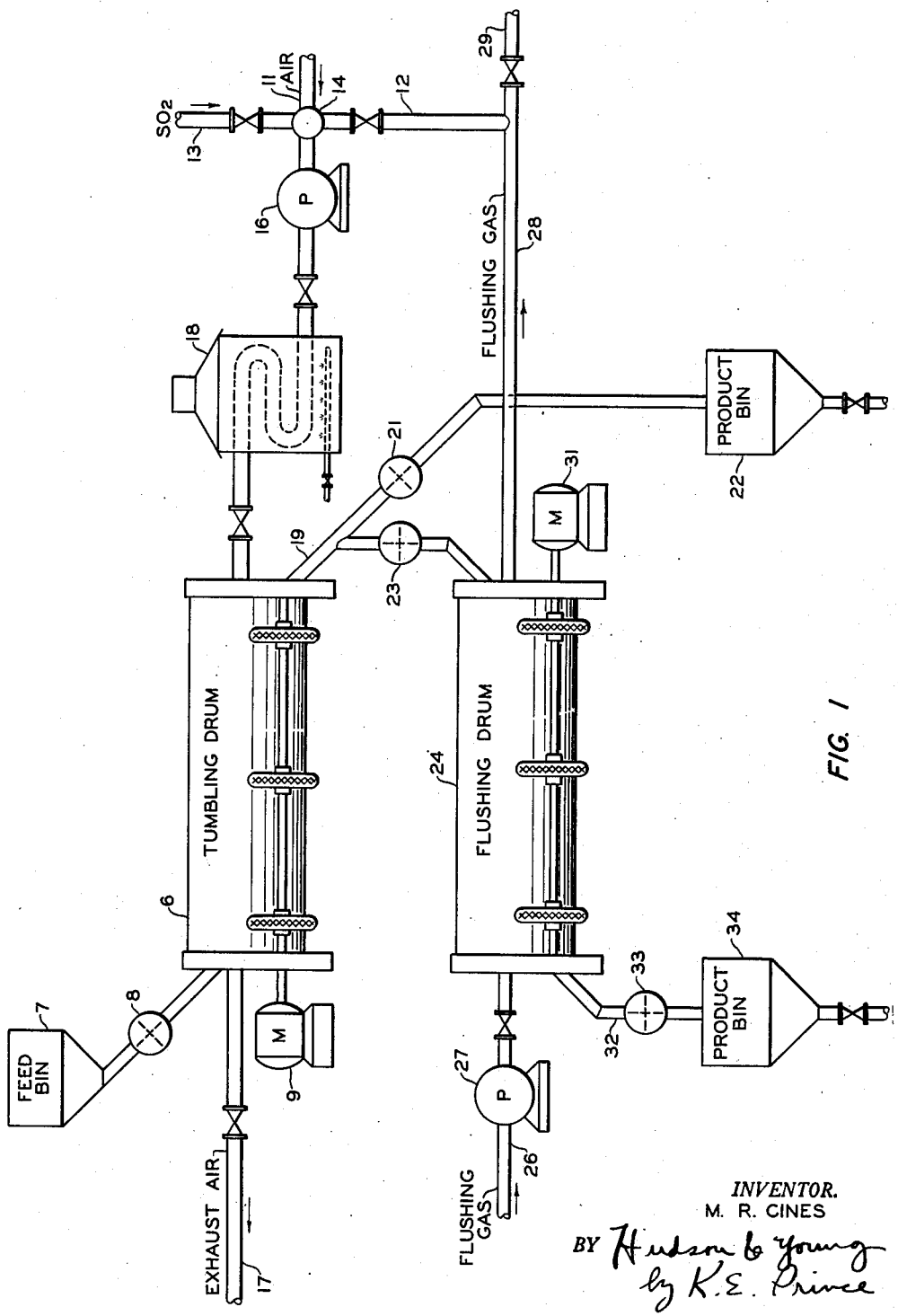
Figure 1 is an elevational view of an apparatus which may be used in treating furnace black according to my invention.

In Figure 1, number 6 is a tumbling drum into which furnace black from feed bin 7 is fed by means of star valve 8. Motor 9 is provided for rotating tumbling drum 6. The furnace black in drum 6 is intimately contacted with air brought into said drum through intake line 11 or flushing gas removal line 12, hereafter discussed. The desired amount of sulfur dioxide is introduced into the air stream through line 13 and mixing valve 14. The mixture of air and sulfur dioxide is blown by blower 16 into tumbling drum 6, from which it is removed through exhaust line 17. Heater 18, positioned between blower 16 and tumbling drum 6, is provided for heating the treating gas if desired. The treated furnace black is removed from tumbling drum 6 through product removal line 19 and star valve 21 into product bin 22.

Under certain circumstances, it may be desirable to remove the physically adsorbed sulfur dioxide from the treated carbon black, in which case, instead of sending the black to bin 22, it may be sent through star valve 23 into a flushing drum 24 through which a stream of air is passed by means of air intake 26 and blower 27. The exhaust air or flushing gas is removed from flushing drum 24 through line 28 and may be allowed to exhaust to the atmosphere through line 29 or all or a portion may be returned to the treating gas stream through line 12. Motor 31 operates flushing drum 24, from which the degassed black is removed through line 32 and star valve 33 into product bin 34.

OPERATION

A major advantage to be gained by treating furnace black according to my process is an increase in the scorch time, which is a measure of the length of time before vulcanization of a rubber mix begins. Rubber compounded with furnace black shows an increase in the scorch time with a decrease in the pH of the black when the decrease is brought about by treatment according to my invention. Another advantage to be gained by such treatment is an increase in the pellet hardness. This is important in that furnace blacks normally form soft pellets which generally do not permit shipment in bulk but require packaging. Since, by my treatment, the pH of the black is lowered as the scorch time is increased, the treating effect may be measured by a determination of the pH lowering, which can be determined more simply than the scorch time. Values of pH below 3 have been obtained by my treatment.

In carrying out my invention I intimately contact the furnace black, either as pellets or raw black, with a stream of air containing from 0.001 to 5.0, preferably 0.01 to 2.0, volume per cent of sulfur dioxide. It is necessary that the treating gas be air or other gas containing free oxygen. Although greater or smaller amounts may be used, I prefer to use from 5 to 50 cubic feet of air per pound of black and maintain contact between the black and air for a time sufficient to obtain the desired changes in properties, which is usually between 10 minutes and 24 hours, though treating times outside this range may be used. It is desirable that intimate contact be maintained between the furnace black and the treating air and that there be a continuous stream of air passing through the reaction vessel. Generally speaking, the treating effect to be realized by treatment with a measured volume of air is dependent on the concentration of the catalyst, the treating temperature, and the intimacy of contact.

Although the desired effects can be obtained by the practice of this invention at temperatures above 300 F., I generally prefer to operate at temperatures not above 300 F., as such temperature levels are more readily attained and maintained. While excellent results have been obtained by treatment at temperatures as low as 32 F., it is not usual to attain such levels without the use of a coolant, which, for obvious reasons, needlessly complicates the process. In general, operating temperatures between 70 and 100 F. are to be preferred since they are readily attainable and the catalyst requirement is low. However, the actual practice of this invention will be dictated by the temperatures which can easily be reached by the various streams being used. The amount of catalyst required at 80 F. is less than that at 160 and only slightly greater than that at 300 F. for the same final pH. The catalyst requirement is so low for the temperature range 70–300 F. that economics will indicate utilization of available temperatures rather than adjusting the temperature for minimum catalyst requirement. At temperatures of about 300 F. and above, a treating effect would be realized from the air alone as described in my copending application, Serial No. 67,674, filed December 28, 1948, for a process for treating furnace blacks with air at elevated temperatures; at such temperatures in the process of the present invention, an increased rate of reaction would result from the presence of the catalyst, $SO_2$.

Numerous methods and apparatus for contacting solids with gases are known to the art, and any of these methods and apparatus may be used which establish intimate contact between the air and black. Among these are rotating drums, fluidized beds, fixed beds with a gas stream passing through it, and other methods.

A convenient method of carrying out my treatment in actual practice is to subject the furnace black to a current of treating air containing the desired amount of sulfur dioxide during the pelleting operation. In this way, the amount of additional equipment is negligible and my treatment does not necessitate an extra treating step. In treating by this method, the loose furnace black is introduced into the pellet mill at a temperature usually between 150° F. and 400° F. and the treating air is introduced into the system at atmospheric temperature. The flow of treating air and furnace black through the pellet mill is usually concurrent but may be countercurrent if provisions are made to prevent the loss of loose material with the exhaust gas. Through the use of air-$SO_2$ treatment in a pellet mill, it is possible to establish mill operating conditions which would not be tolerated by untreated black. These conditions permitted by the practice of this invention are all in the direction of increasing the input of mechanical work, that is increasing the speed of rotation of the mills as well as increasing the depth of the bed of black within the mill. Through the use of these conditions which put more mechanical work into the pelleting process, the hardness of the resulting pellets is improved substantially.

When operating by the above method, the mill temperature is governed by the temperatures of the entering air and black and the rate of heat loss from the mill. The temperature established within the mill will thus be between that of the entering black and that of the entering air. If it is desired to operate at a temperature above that established under these conditions, the mill and/or the air may be heated and heat losses from the mill reduced by suitable insulation or housing.

Subsequent to the treating step, it may be desirable to remove the physically adsorbed sulfur dioxide from the treated black and for this purpose, I prefer to contact intimately the treated black with a stream of air as a flushing gas. A convenient way to accomplish this is to use a tumbling drum similar to the one used in the treating step. However, any method which establishes sufficiently intimate contact between the treated black and the flushing gas is satisfactory. Another method of removing the physically adsorbed $SO_2$ is to subject the treated black to a vacuum. For uses wherein the presence of small amounts of sulfur dioxide adsorbed on the furnace black does not interfere, the flushing step may be omitted.

If the sulfur dioxide is to be flushed from the treated black by a stream of air, the exhaust air from such flushing step may be passed to the treating step after the addition of sufficient sulfur dioxide catalyst to give the desired concentration. This procedure will permit recovery of a portion of the sulfur dioxide. However, since sulfur dioxide is such a cheap material, it may be preferable to discard the exhaust flushing gas entirely and not attempt to use it as a treating gas. If air is used as the flushing gas, some treating, ordinarily much less than during the primary treating step, will occur during flushing because of the combined presence of sulfur dioxide and oxygen. This amount of treating can be taken into consideration in determining the conditions of contact in the treating step.

My invention is not to be confused with any treatment of the prior art wherein carbon black is treated with a gaseous acidic treating agent, which is physically adsorbed by the black and thereby results in a lowering of the pH. If carbon blacks treated according to such a process are subjected to a flushing or degassing step, the adsorbed acid is removed and the effect of the treatment is destroyed or rendered ineffective. Such treatment does not produce any permanent increase in the scorch time, and the pH lowering results entirely from the addition of acid. Treatment of a high pH furnace black with sulfur dioxide alone or with sulfur dioxide in aqueous or other liquid medium would not be the equivalent of my process by which furnace black is treated with air containing catalytic amounts of sulfur dioxide. It is important that the treating gas contain free oxygen; and for economy in operation, air is preferred.

My invention will be more clearly understood from a study of the following examples, which have been selected to show, in a minimum of space, the advantages of my treatment.

EXAMPLE I

This test was carried out during the dry pelleting operation carried out in a furnace black pellet mill six feet in diameter by forty-eight feet long, having a feed rate of 21,000 pounds of loose HMF black per day, and a carbon black recycle rate of 22,000 pounds per day. A 14,500 cubic foot per hour (standard temperature and pressure) air-stream was fed concurrently into the pellet mill to contact intimately the black being pelleted. The average air temperature was 85° F., the loose furnace black temperature was 180° F. and the exit pellet temperature was 110° F. The treating air stream contained 0.14 mol per cent sulfur dioxide and the treating time was the normal pelleting time. The pH of the furnace black was reduced from an original value of 9.8 to 6.2.

EXAMPLE II

Treatments at temperatures of 80° F., 150° F., and 300° F. were carried out on samples of a dried HAF furnace black having an original pH of about 9.8. In each test the treating time was approximately two hours and the dry air flow rate was 12.9 cubic feet of air per pound of furnace black. The treating air for the various tests contained varying amounts of dry sulfur dioxide as indicated in the table. Physically adsorbed sulfur dioxide was removed from the treated black by heating said black for a period of 15 hours at 230° F., after which the pH of the degassed black was determined by the standard procedure. From these values, curves were drawn showing the mol per cent of sulfur dioxide plotted against the pH of the degassed black. The following data were taken from these curves.

Table 1

EFFECT OF TEMPERATURE AND $SO_2$ CONCENTRATION ON pH OF AN HAF BLACK

| pH | Concentration of $SO_2$, Mol Percent | | |
|---|---|---|---|
| | 74–96° F. | 160° F. | 300° F. |
| 9.8 | 0 | | |
| 9.0 | 0.11 | 0.17 | 0.05 |
| 8.0 | 0.26 | 0.40 | 0.12 |
| 7.0 | 0.42 | 0.71 | 0.21 |
| 6.0 | 0.61 | 1.06 | 0.33 |
| 5.0 | 0.83 | 1.47 | 0.51 |
| 4.0 | 1.13 | 1.91 | 0.78 |
| 3.2 | 1.55 and higher | | 1.3 and higher |

EXAMPLE III

Treatment of an untreated furnace black at 80° F. with 5 volume per cent dry sulfur dioxide in dry nitrogen for 30 minutes in a circulating bed produced a lowering of the pH of only 1.4 units as compared with a lowering of 5.0 units under the same conditions using dry air instead of nitrogen.

EXAMPLE IV

The effect of my $SO_2$-air treated furnace blacks on rubber properties was tested by compounding test samples of rubber in which the furnace black was $SO_2$-air treated according to my previously described method. The degree of treatment varied with the different samples.

The rubber recipe used in these tests was:

| | Parts |
|---|---|
| Smoked sheet (#2) | 100 |
| Black | 40 |
| ZnO (#1) | 4 |
| Asphalt #6 (#1) | 6 |
| Stearic acid (#1) | 3 |
| PBNA (#1) | 1.5 |
| Sulfur (#1) | 2 |
| Santocure (#1) | 0.4 |

The rubber properties were as shown in the following table.

Table 2

| pH | Properties of $SO_2$-Air Treated HAF Black—Natural Rubber Compounds | | | |
|---|---|---|---|---|
| | 300% Modulus, p. s. i. | Tensile, p. s. i. | Abrasion Loss, Gms. | Scorch Time, Min. |
| 9.4 | 1,020 | 3,470 | 5.93 | 16.5 |
| 6.6 | 1,060 | 3,590 | 5.84 | 23.5 |
| 5.1 | 1,045 | 3,600 | 5.47 | 23.5 |
| 4.2 | 990 | 3,630 | 5.55 | 23.5 |
| 9.5 [1] | 990 | 3,570 | 5.20 | 18.5 |

[1] Control.

EXAMPLE V

A sample of furnace black exposed for 10 minutes to 2.0% $SO_2$ in air at 32 F. and then flushed with nitrogen for ½ hour had a pH of 8.6, a pH reduction of 0.9 unit. The air flow was approximately 10 cubic feet per pound of black.

The examples presented are merely illustrative and are not to be considered as limiting my invention, the scope of which is defined by the following claims.

Having described my invention, I claim:

1. A process for treating high pH furnace carbon black which comprises: introducing said carbon black into a dry pelleting zone; contacting said carbon black with a free oxygen-containing gas containing, as an added constituent, sulfur dioxide in an amount of from 0.01 to 5 per cent by volume at a rate of from 5 to 50 cubic feet of said air per pound of carbon black introduced at a temperature of at least 32° F.; pelleting said carbon black within said pelleting zone; removing from said pelleting zone resulting carbon black pellets having a pH of from 3 to 7; and withdrawing a resulting gas stream from said pelleting zone.

2. The process of claim 1 in which the temperature of said treatment is below 300° F.

3. The process of claim 1 in which said treated carbon black is intimately contacted with a current of air for a period of time sufficient to remove absorbed sulphur dioxide from said black.

4. A process for treating high pH furnace carbon black which comprises, continuously passing said carbon black at a temperature of from 150 to 400° F. into a dry pelleting zone, continuously passing air containing from 0.01 to 2 volume per cent sulfur dioxide at atmospheric temperature into said pelleting zone at a rate of from 5 to 50 cubic feet per pound of said carbon black introduced, therein directly contacting said air and said carbon black for a period of time of from 10 minutes to 24 hours, continuously withdrawing resulting furnace carbon black pellets having a pH of from 3 to 7 from said pelleting zone, and continuously withdrawing a resulting gas stream from said pelleting zone.

MARTIN R. CINES.

References Cited in the file of this patent

UNITED STATES PATENTS

| Number | Name | Date |
|---|---|---|
| 2,210,763 | King | Aug. 6, 1940 |
| 2,317,026 | Brown | Apr. 20, 1943 |
| 2,420,810 | Bray | May 20, 1947 |
| 2,479,708 | Amon | Aug. 23, 1949 |
| 2,516,233 | McKinnis | July 25, 1950 |

OTHER REFERENCES

Zapp, Industrial and Engineering Chemistry, vol. 36, No. 2, February 1944, pages 128–133.

Braendle et al.—India Rubber World, vol. 119, N. Y., October 1948, No. 1, pages 57–62.

Sweitzer et al.—The Rubber Age—vol. 55, No. 5, August 1944, pages 469–478.